(No Model.)

W. C. GOLDNER.
GALVANIC BATTERY.

No. 348,901. Patented Sept. 7, 1886.

Witnesses,
J. J. Maloney
H. P. Bates

Inventor,
Wm. C. Goldner,
by Jos. P. Livermore
Atty.

N. PETERS, Photo-Lithographer, Washington, D. C.

UNITED STATES PATENT OFFICE.

WILLIAM C. GOLDNER, OF BOSTON, MASS., ASSIGNOR TO THE CHEMICAL ELECTRIC LIGHT AND POWER COMPANY, OF PORTLAND, ME.

GALVANIC BATTERY.

SPECIFICATION forming part of Letters Patent No. 348,901, dated September 7, 1886.

Application filed January 25, 1886. Serial No. 189,653. (No model.)

*To all whom it may concern:*

Be it known that I, WILLIAM C. GOLDNER, of Boston, county of Suffolk, State of Massachusetts, have invented an Improvement in Galvanic Batteries, of which the following description, in connection with the accompanying drawings, is a specification, like letters on the drawings representing like parts.

My invention relates to galvanic batteries; and it consists in novel details of construction, which will be hereinafter described and claimed.

Figure 1:
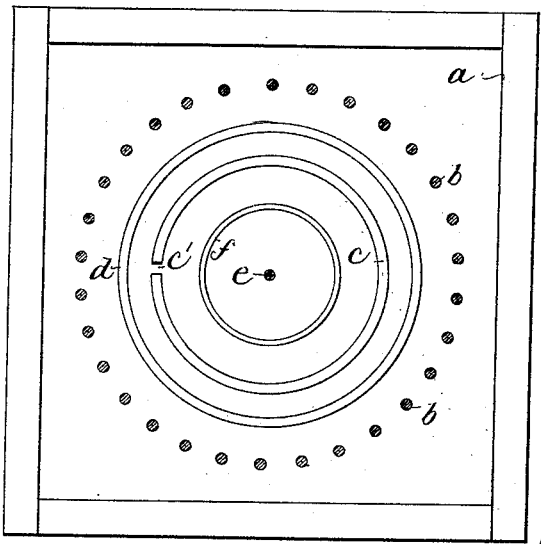
Figure 2:
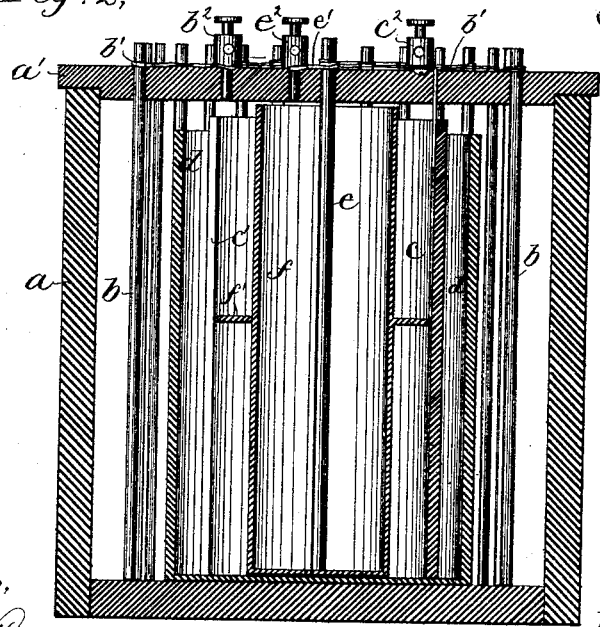

Figure 1 is a plan view of a battery-cell embodying this invention, showing the carbons in horizontal section; Fig. 2, a vertical section thereof, and Fig. 3 a diagram to be referred to.

The outer or main receptacle, $a$, may be of any suitable or usual material—such as glass or glazed earthenware, or wood lined with lead or paraffine, or other substance which will resist the action of the fluids used in the battery.

In the outer jars, $a$, is placed the outer carbon electrode, shown as composed of a number of carbon pencils, $b$, such as commonly employed in electric arc-lamps, the said pencils being arranged in a circle and shown as placed in suitable sockets in the cover $a'$ of the jar and electrically connected together by a wire, $b'$, twisted around each one.

Within the carbon electrode $b$ and concentric with it is the zinc cylinder $c$, which may have a longitudinal slit, as shown at $c'$, and which is shown as contained within a porous cup, $d$, the walls of which are interposed between the outer surface of the zinc $c$ and the outer carbon pole, $b$, so that when the battery is supplied with the usual exciting-fluid the electric action takes place between the outer surface of the zinc $c$ and the carbon $b$ in the usual manner, and if only the outer carbon, $b$, were employed the inner surface of the zinc would have but little, if any, beneficial effect.

In order to utilize the inner surface of the zinc and thus produce a battery of greater capacity without corresponding increase in the size of the cell, the cell is also provided with an inner carbon, $e$, which may also be a pencil, such as employed for electric lamps, and which is contained within a porous cup, $f$, interposed between it and the inner surface of the zinc $c$. The porous cup $f$ is provided with a flange or projection, $f'$, which serves to center it in the zinc $c$.

The carbons $b$ $e$ and the zinc $c$ are provided with the usual binding-screws, $b^2$ $c^2$ $e^2$, for connecting them with the wires, and in practice one terminal of the external circuit will be connected with the binding-post $c^2$ and the zinc and the other terminal connected with both binding-posts $b^2$ and $e^2$, thus making practically two elements connected in multiple arc and producing about double the quantity of electricity that would be produced by the zinc in connection with but one only of the said carbon electrodes, as in batteries of usual construction.

By making the outer carbon, $b$, as a series of separate pencils, as shown, ample space is afforded for the diffusion of liquid throughout the space between the outer jar, $a$, and the porous cup $d$, and at the same time the surface of carbon exposed to the fluid between the carbon and the zinc is about as great as if a single cylindrical carbon were employed.

Figure 3:
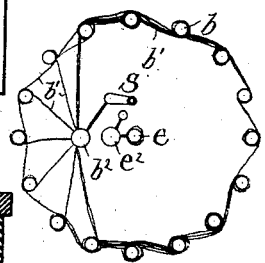

The wires $b'$, connecting the carbon pencils $b$, may be arranged as shown in Fig. 3, there being but a single wire leading from the carbon most remote from the binding-post $e^2$, and additional wires or strands being added in approaching the said binding-post to afford increased conductivity for the current added by the different pencils, and a switch, $s$, may be employed to connect the binding-posts $b^2$ $e^2$ when desired.

I claim—

1. A cell for a galvanic battery, comprising an outer vessel or receptacle, $a$, a porous cup, $d$, therein, and a second porous cup, $f$, of smaller diameter inside the first-mentioned porous cup, combined with an electrode, $b$, composed of a number of pieces of carbon arranged around the outside of the larger porous cup, $d$, a zinc electrode, $c$, inside of the outer and outside of the inner porous cups, and a carbon electrode, $e$, inside the inner porous cup, substantially as described.

2. In a cell for a galvanic battery, an outer vessel, $a$, and concentric porous cups $d$ $f$, of different diameter therein, combined with a removable cover for the outer receptacle and an annular series of carbon rods, b, supported therein in position to extend down around the outside of the larger porous cup, and a carbon electrode, c, also supported in said cover in position to extend into the inner porous cup, and a zinc electrode between the outer surface of the inner porous cup and inner surface of the outer porous cup, substantially as described.

3. In a cell for a galvanic battery, an outer vessel and concentric porous cups of different diameter therein, combined with a zinc electrode between the said porous cups, a removable cover for the outer receptacle, and an annular series of carbon rods supported in the said cover around the outside of the larger porous cup, a carbon electrode supported in said cover inside the inner porous cup, and a switch on said cover for connecting or disconnecting the said carbon electrodes, substantially as described.

In testimony whereof I have signed my name to this specification in the presence of two subscribing witnesses.

WM. C. GOLDNER.

Witnesses:
  JOS. P. LIVERMORE,
  JAS. H. HOWARD.